United States Patent [19]

Harral et al.

[11] Patent Number: 5,199,423
[45] Date of Patent: Apr. 6, 1993

[54] OXYGEN-RICH GAS BREATHING SYSTEMS FOR PASSENGER CARRYING AIRCRAFT

[75] Inventors: Michael W. Harral, Yeovil; Robin H. J. Searle, Hardington Mandeville, both of England

[73] Assignee: Normalair-Garrett (Holdings) Ltd., England

[21] Appl. No.: 651,192

[22] Filed: Feb. 6, 1991

[30] Foreign Application Priority Data

Feb. 10, 1990 [GB] United Kingdom ............... 9003033

[51] Int. Cl.⁵ ..................... A62B 21/00; A62B 7/00
[52] U.S. Cl. ..................... 128/202.26; 128/205.24; 128/204.22; 128/204.29
[58] Field of Search ............ 128/204.15, 204.16, 128/204.18, 204.24, 204.25, 205.18, 205.24, 204.21, 204.22, 204.29, 202.26

[56] References Cited

U.S. PATENT DOCUMENTS

| | | | |
|---|---|---|---|
| 3,103,927 | 9/1963 | Henneman et al. | 128/201.28 |
| 3,190,287 | 6/1965 | Miller | 128/202.11 |
| 3,720,501 | 3/1973 | Cramer et al. | 128/202.26 X |
| 3,995,626 | 12/1976 | Pearce | 128/205.24 |
| 4,109,509 | 8/1978 | Cramer et al. | 128/204.22 X |
| 4,428,372 | 1/1984 | Beysel et al. | 128/205.12 X |
| 4,619,255 | 10/1986 | Spinosa et al. | 128/202.27 |
| 4,651,728 | 3/1987 | Gupta et al. | 128/201.28 |
| 4,687,013 | 8/1987 | Stevenson | 128/204.24 X |
| 4,870,960 | 10/1989 | Hradek | 128/202.22 |
| 4,928,682 | 5/1990 | Stevenson et al. | 128/202.26 |
| 4,960,119 | 10/1990 | Hamlin | 128/201.25 X |

Primary Examiner—V. Millin
Assistant Examiner—Sebastiano Passaniti
Attorney, Agent, or Firm—Larson & Taylor

[57] ABSTRACT

A system and apparatus are disclosed for providing oxygen-rich gas for breathing by aircrew and passengers of commercial passenger aircraft. Oxygen-rich gas output by molecular sieve concentrator apparatus 11 is delivered by way of a compressor 17 and a priority valve 24 to a flight crew gas storage cylinder 22 and passenger gas storage cylinders 23. An electronic control unit (ECU) 38 controls cycling of the concentrator apparatus 11 in obtainment of gas enriched with oxygen to at least 90%. The ECU is connected for receiving signals from a monitor 35 which senses the content of oxygen in gas delivered by the concentrator apparatus. The ECU receives signals from pressure sensors 42 and 43 in the cylinders 22 and 23 to initiate start up of the system when the content of these cylinders is sensed to have fallen below a predetermined value. The ECU is connected to switch the priority valve for preferential charging of the crew cylinder when both sets of cylinders require charging. The ECU is further connected for opening a vent valve 46 whereby on start-up of the system, gas delivered by the concentrator apparatus is vented to ambient until the oxygen concentration is sensed to be 90% or more. The system reduces the requirement for ground servicing and weight of oxygen gas storage cylinders carried by present day passenger carrying aircraft. Also, it enables the number of cylinders to be kept at a minimum in meeting the requirements for emergency oxygen on new air routes which are now being developed.

6 Claims, 4 Drawing Sheets

OXYGEN-RICH GAS BREATHING SYSTEMS FOR PASSENGER CARRYING AIRCRAFT

BACKGROUND OF THE INVENTION

1. Field of the Invention

This invention relates to oxygen-rich gas breathing systems and is more particularly concerned with a system and apparatus for providing oxygen-rich gas for breathing by aircrew and passengers of commercial passenger aircraft and for use in medical evacuation aircraft.

2. Description of the Prior Art

It is a requirement in passenger carrying aircraft that oxygen be provided for breathing by flight crew, cabin crew and passengers, particularly in emergency situations such as cabin decompression. Generally the flight crew breathing system is separate from the passenger breathing system and oxygen is supplied from pressurised gaseous oxygen cylinders. It is also a requirement that oxygen be available for continuous breathing by one of the aircrew flying the aircraft during flight above 12000 meters to provide protection against the effect of altitude in the event of instantaneous cabin decompression. Ideally oxygen for the latter requirement should be made available without depleting the stored oxygen source for the emergency system. The passenger system is designed to provide protection against cabin decompression at altitude and is required to provide oxygen for up to ten minutes duration while the aircraft descends to a safe altitude of 3000 meters. For this purpose chlorate candles are generally used although gaseous oxygen may also be made available in the passenger cabin for use by the cabin crew for therapeutic purposes during high altitude flight. In some larger aircraft gaseous oxygen may be provided for the passenger system and additional gaseous oxygen may be carried for extended duration oxygen use over the ten minutes requirement.

The development of new air routes in certain areas of the world presents a problem because some parts of these routes are over mountainous terrain which does not permit descent to 3000 meters in the event of cabin decompression. This gives rise to a requirement for oxygen to be made available for use at altitudes up to 6000 meters over longer periods which may be forty minutes or more. For durations above ten minutes, chlorate candle operation is unreliable and the provision of additional cylinders for storage of gaseous oxygen gives rise to weight and space penalties.

Systems using gaseous oxygen stored in cylinders require frequent servicing and recharging to maintain pressure, such servicing and re-charging being accomplished either on the aircraft from a ground source or by replacement of the cylinders. As the cylinders may have to be transportable outside of the aircraft they are subject to regulations which increase their weight compared to normal aircraft design practice.

U.S. Pat. No. 4,960,119 (Normalair-Garrett) discloses an aircraft aircrew life support system for use in military aircraft. The system comprises an on-board oxygen generating system (OBOGS) having molecular sieve adsorber beds or oxygen concentrators controlled to deliver breathable gas enriched with oxygen to a percentage concentration, say 55% to 60%, suitable for meeting aircrew breathing requirements during normal flight operation from ground level to maximum aircraft operating altitude of 18300 meters (60000 feet) with a pressurised cabin, i.e. maximum aircraft cabin operating altitude of 6100 meters (20000 feet). Breathable gas in this concentration range is increased in pressure by a pressure intensifier or compressor before being delivered to a storage tank from which it is supplied to an aircrew member by way of a breathing regulator and a face mask. Additionally, at times when the pressure in the storage tank is above a predetermined value and it is not being charged, the OBOGS may be switched to control the oxygen concentrators to deliver breathable gas of maximum oxygen concentration, at least 90% oxygen, for topping up an emergency breathable gas storage bottle associated with an ejection seat and for use during bail out, if the pressure in this storage bottle is sensed to have fallen below a predetermined minimum value. Because of the need to supply breathable gas in all flight regimes, the oxygen concentrators and the compressor must be sized to meet this requirement and the storage tank must have a capacity to handle the breathing gas demand including peaks in breathing demand when the aircrew member is breathing deeply or fast during a strenuous flight manoeuvre. At the same time provision must be made for changing cycling of the oxygen concentrators to obtain delivery of substantially pure oxygen for meeting the requirement to top up the emergency gas storage bottle.

Other disclosures of military aircraft breathing systems having a facility for storing breathable gas delivered by an OBOGS are to be found in U.S. Pat. No. 4,428,372 (issued to Linde and now assigned to present applicant) and U.S. Pat. No. 4,651,728 (Boeing). In U.S. Pat. No. 4,428,372 a portion of the oxygen-rich breathing gas delivered by oxygen concentrators is stored in an emergency storage tank from which it may be withdrawn for breathing in the event of interruption of the normal supply from the concentrators. U.S. Pat. No. 4,651,728 provides a system having a standby supply of breathable gas and an emergency supply of breathable gas stored in separate cylinders. A selector valve is provided whereby breathable gas may be withdrawn from the standby cylinder when the aircraft is on the ground with the OBOGS non-operational or during flight if the system malfunctions. The emergency gas cylinder is included primarily as a source of breathable gas for use by the aircrew during bail out from the aircraft but may also be used in the event of failure of both the OBOGS and the standby cylinder. Again, the systems which are the subject of these disclosures must meet the requirement for continuous breathing during normal flight operations from ground level to maximum aircraft operating altitude of an aircraft having one or two aircrew so that they must be sized accordingly.

SUMMARY OF THE INVENTION

It is an object of the present invention to provide a system and apparatus for generating and supplying oxygen-rich gas on-board of an aircraft which meets the requirements for oxygen to be available for breathing by the flight crew and passengers of commercial passenger carrying aircraft and which is also suitable for supplying oxygen-rich breathing gas for use in aircraft operating in a medical evacuation role.

Accordingly, in one aspect the present invention provides a system for supplying oxygen-rich gas for breathing by crew and passengers of a passenger carrying aircraft, the system comprising molecular sieve oxygen concentrator means operable to deliver oxygen-rich gas, compressor means connected for receiving oxygen-rich gas delivered by the concentrator means and operable to deliver said oxygen-rich gas at increased pressure, first gas storage means connected for receiving said oxygen-rich gas from said compressor means and for delivering said gas to flight crew members of the aircraft, second gas storage means connected for receiving oxygen-rich gas from said compressor means and for delivering said gas to passengers of the aircraft, means for monitoring the content of oxygen in oxygen-rich gas delivered by said concentrator means, control means connected for receiving signals from the oxygen content monitoring means and further connected for outputting signals for control of said concentrator means, means for sensing the pressure of gas stored in said first and second storage means and connected for delivering signals to said control means whereby the gas content of said first and second storage means may be computed by said control means and signals output by said control means to initiate operation of said concentrator means and said compressor means to generate pressurised oxygen-rich gas suitable for charging said storage means when the content of either one or both of said storage means is computed to have fallen below a required value.

Preferably the system includes priority valve means located in a delivery line from the compressor means to the first and second gas storage means and operably connected to the control means whereby the priority valve means may be signalled to switch for priority charging of said first product gas storage means when both said first and second storage means are sensed to have fallen below a required content value.

By the term 'oxygen-rich gas' we mean gas comprising at least 90% oxygen with the remainder being other gases including argon.

As the molecular sieve material used for oxygen/nitrogen separation does not have selectivity for oxygen/argon, the maximum oxygen purity which can be achieved is approximately 95%.

A system in accordance with the present invention preferably includes spill valve means located in a delivery line between the concentrator means and the compressor means, the spill valve means being operable by the control means to vent to ambient gas delivered by the concentrator means when the oxygen concentration is less than 90% such as will be the case immediately following initiation of operation of the concentrator means.

In another aspect the present invention provides apparatus for generating oxygen-rich gas for a system supplying oxygen-rich gas for breathing by crew and passengers of a passenger carrying aircraft, comprising a plurality of multi-bed molecular sieve oxygen concentrators each having a supply air inlet end and an oxygen-rich gas outlet end, supply air inlet means adapted for connection to a source of supply air and including pressure regulating means and manifold means connected for distributing supply air to the inlet ends of the concentrators, means for monitoring the content of oxygen in oxygen-rich gas delivered by the concentrators, control means responsive to signals from the oxygen content monitor means for controlling cycling of the concentrator beds between on-stream/charge and off-stream/purge phases whereby gas enriched with oxygen to substantially maximum concentration is delivered at the outlet ends of the concentrators, manifold means connected to the outlet ends of the concentrators for receiving oxygen-rich gas delivered by the concentrators, compressor means including inlet means connected to the oxygen-rich gas manifold means for receiving said gas and operable to increase the pressure of said gas for delivery from intensifier outlet means.

The compressor means may comprise discrete compressors associated one with each concentrator or a common compressor connected for receiving oxygen-rich gas from all of the concentrators.

Apparatus in accordance with one embodiment of the invention provides a packaging arrangement having product gas pressurising piston and cylinder assemblies of the compressor adapted to be driven by supply air which is ducted to the compressor from the supply air delivery means by way of a duct having multi-bed concentrators arranged therearound.

The multi-bed concentrators are preferably of the type disclosed in U.S. Pat. No. 4,737,170 (Normalair-Garrett) having molecular sieve beds arranged concentrically of each other with a supply air inlet and a purge gas outlet of each bed controlled by diaphragm valves. A solenoid valve controlling servo-pressure in a servo-pressure chamber associated with the diaphragm valves of each sieve bed is connected for receiving signals from the control means whereby the beds are switched between on-stream and off-stream phases.

The monitor means may take various forms but in preferred embodiments comprises an oxygen concentration sensor of the type that provides a signal directly indicative of oxygen concentration, such as a zirconia cell-type of oxygen concentration sensor. Such a device has a very rapid response to changes in oxygen concentration and can therefore enable the system to respond rapidly to changing conditions.

If desired monitor means may be associated with each concentrator so as to monitor the oxygen content of product gas delivered by each concentrator and means may be provided for shutting down and isolating an individual concentrator in the event of malfunction.

A system and apparatus in accordance with the present invention may be made adaptable to a wide range of supply conditions by providing for the compressor means to operate over a wide range of delivery rates under the authority of the control means. This requires the provision of additional means for monitoring the supply air quality and suitable control logic in the control means. This enables a high flow of product gas to be taken from the concentrator apparatus under good conditions with a reduced flow at other times.

Whilst concentrator apparatus in accordance with the present invention may be sized to generate a flow of oxygen-rich gas suitable for charging gas storage means located in the aircraft from an empty state to a fully-charged state, it may be preferred to provide concentrator apparatus of smaller size and weight having an oxygen-rich gas flow output suitable for re-charging the gas storage means to maintain a required product gas content therein, the storage means being adapted for initial charging with gaseous oxygen to a fully charged state when the aircraft is on the ground.

In contradistinction with prior art military breathing systems, particularly as exemplified by the disclosures of U.S. Pat. No. 4,960,119, U.S. Pat. No. 4,428,372 and U.S. Pat. No. 4,651,728, a breathing system in accordance with the present invention for meeting the requirement for oxygen-rich gas for breathing or passenger carrying aircraft, utilises oxygen concentrators solely to generate oxygen-rich gas of highest practicable oxygen concentration in order to produce a supply of gas for charging aircrew and passenger storage systems, so that the oxygen concentrators and an associated compressor may be sized accordingly.

The system and apparatus disclosed by the present invention permits gas storage means located in the aircraft to be maintained in a fully charged state by on-board generation of oxygen-rich gas thereby reducing the requirement for ground servicing. Cylinders used as the storage means in existing passenger carrying aircraft systems have a volume in the order of 3 cubic meters (115 cubic ft) and are required to be stressed against road transport and handling so that they weigh approximately 45 Kg (100 lbs) each. Cylinders associated with a system in accordance with the present invention would not generally be required to be removed from the aircraft so that normal aircraft stressing practice may be applied. This means that a 3 cubic meters capacity cylinder with a nominal operating pressure of 12.4 MPa (1800 psig) could weigh less than 23 Kg (50 lbs) which represents a saving of approximately 340 Kg (750 lbs) for a system having 15 cylinders. This is based on the use of conventional steel cylinders, and a greater saving may be made if composite construction is used. Protection against handling during installation and any subsequent removal may be addressed by pallet mounting the cylinders and by providing a protective enclosure to prevent inadvertent damage.

Other advantageous features of a system and apparatus in accordance with the present invention may be summarised as:

i. Storage capacity to meet the most demanding sustaining requirement is provided from the storage cylinders.
ii. A relatively small concentrator apparatus is used to top up the cylinders and provide for crew breathing and other routine functions.
iii. The system is completely autonomous and no ground servicing or replenishment is required in normal operation (a port should probably be provided for ground charging of the cylinders following initial installation).
iv. Lightweight (aerospace) storage cylinders may potentially be used.
v. The system is safe if decompression is accompanied by loss of bleed air supply to the concentrator apparatus.
vi. High pressure breathing gas is supplied which may be used with existing crew and passenger systems.
vii. A pre-flight contents check on the cylinders indicates that the system is prepared for flight.
viii. Low bleed air flows are required.

BRIEF DESCRIPTION OF THE DRAWINGS

The invention will now be further described by way of example and with reference to the accompanying drawings in which.

DETAILED DESCRIPTION OF THE DRAWINGS

Figure 3:
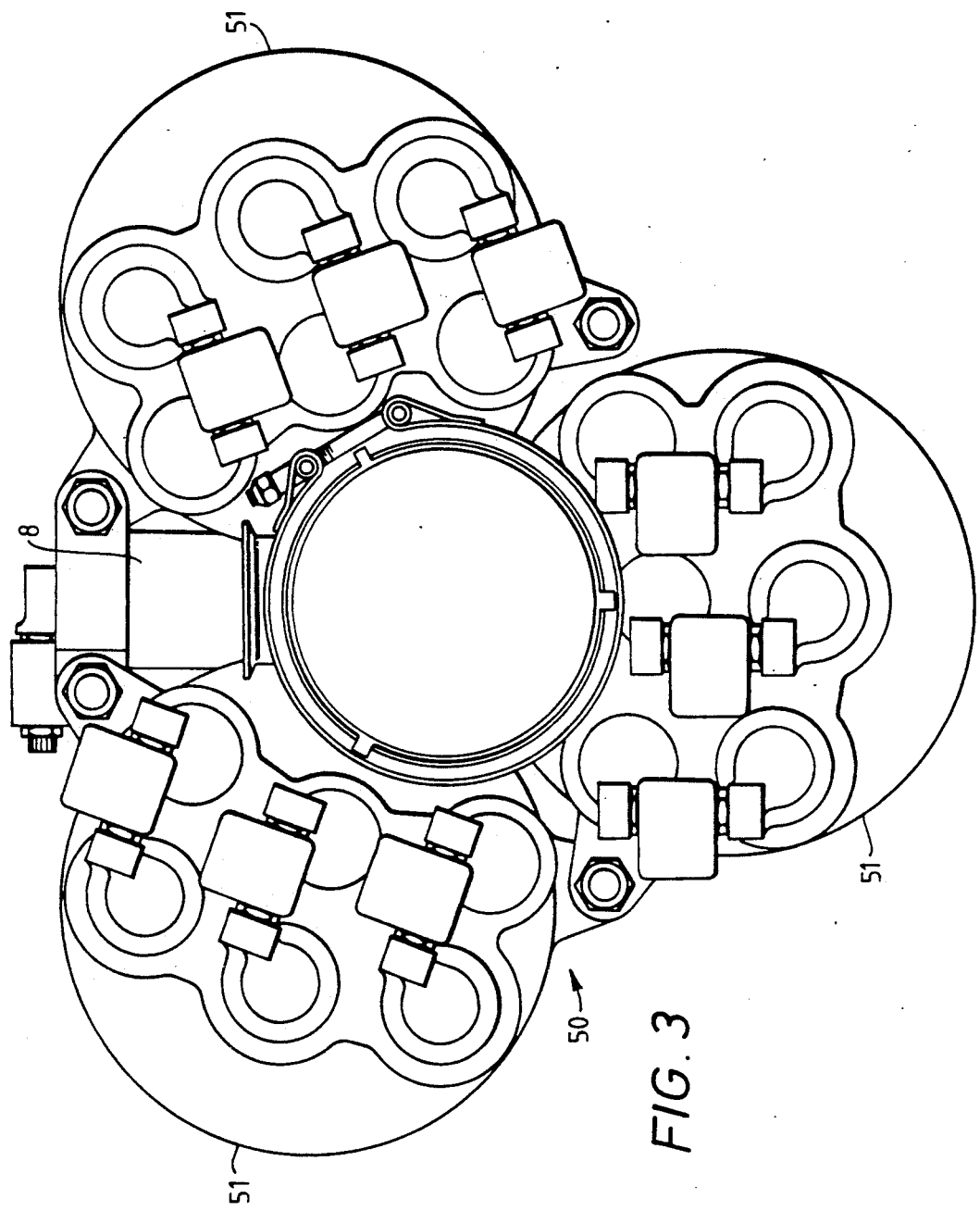
FIG. 3 is a view in plan of the inlet end of the apparatus shown in FIG. 2.
Figure 4:
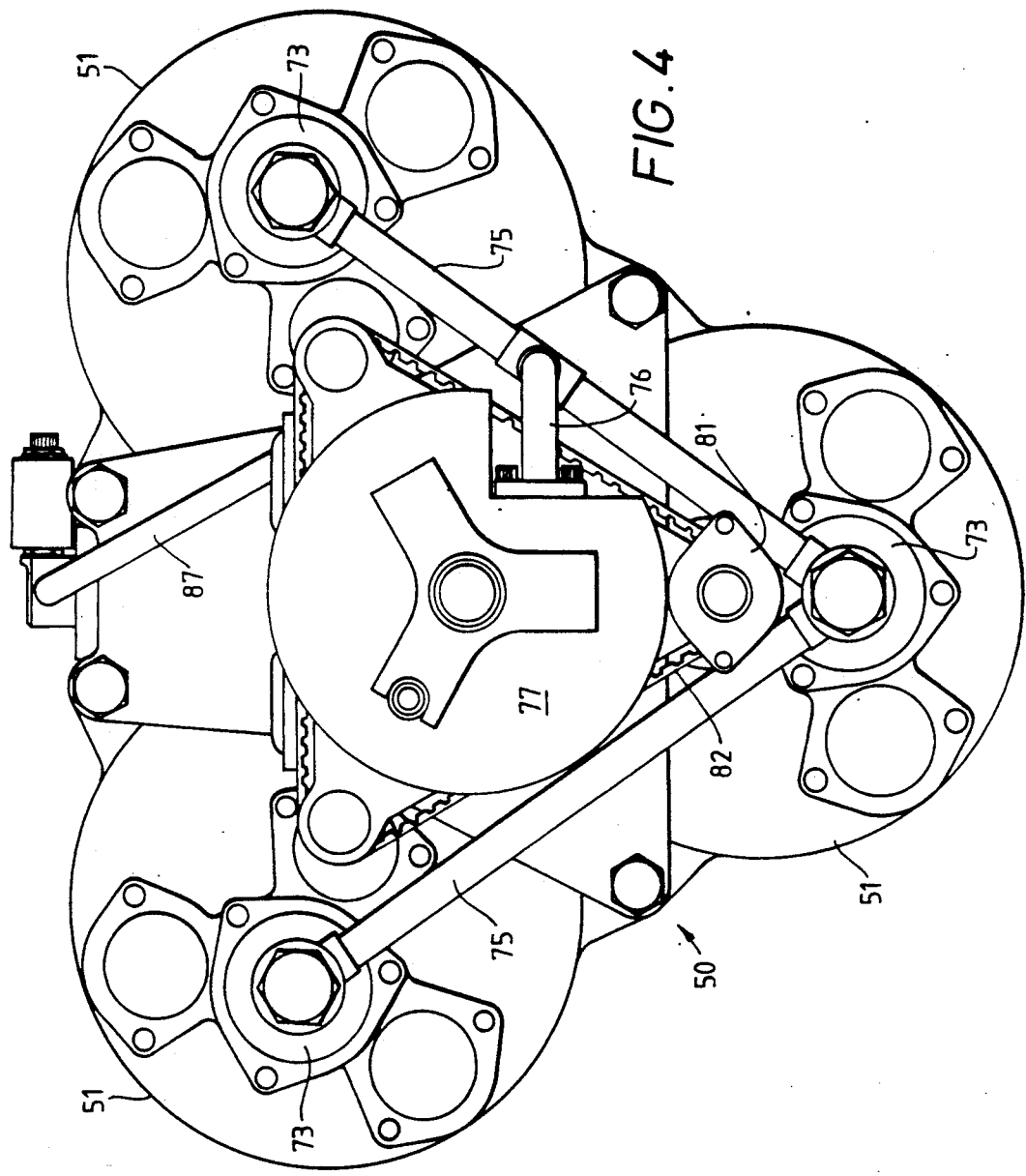
FIG. 4 is a view in plan of the outlet end of the apparatus shown in FIG. 2.

A system for producing oxygen-rich gas (i.e. 90-95% oxygen) for breathing on-board a passenger carrying aircraft, as illustrated diagramatically in FIG. 1 of the accompanying drawings, comprises a molecular sieve concentrator apparatus 11 such as will hereinafter be described with reference to FIGS. 2, 3 and 4 of the accompanying drawings. The concentrator apparatus 11 receives supply air by way of a supply line 12 which incorporates a shut-off valve 13, a filter and water separator 14 and a pressure reducing valve 15. The source of supply air is conveniently bleed air from a compressor stage of one or more of the aircraft engines. The concentrator is operated to generate oxygen-rich gas which is fed by a delivery line 16 to a compressor 17 that in this embodiment has pneumatically driven oxygen-rich gas pressurising piston and cylinder assemblies (not shown). Air for driving the pressurising piston and cylinder assemblies is supply air fed to the compressor 17 through a supply line 18 which connects with the supply line 12 downstream of the pressure reducing valve 15.

Figure 1:
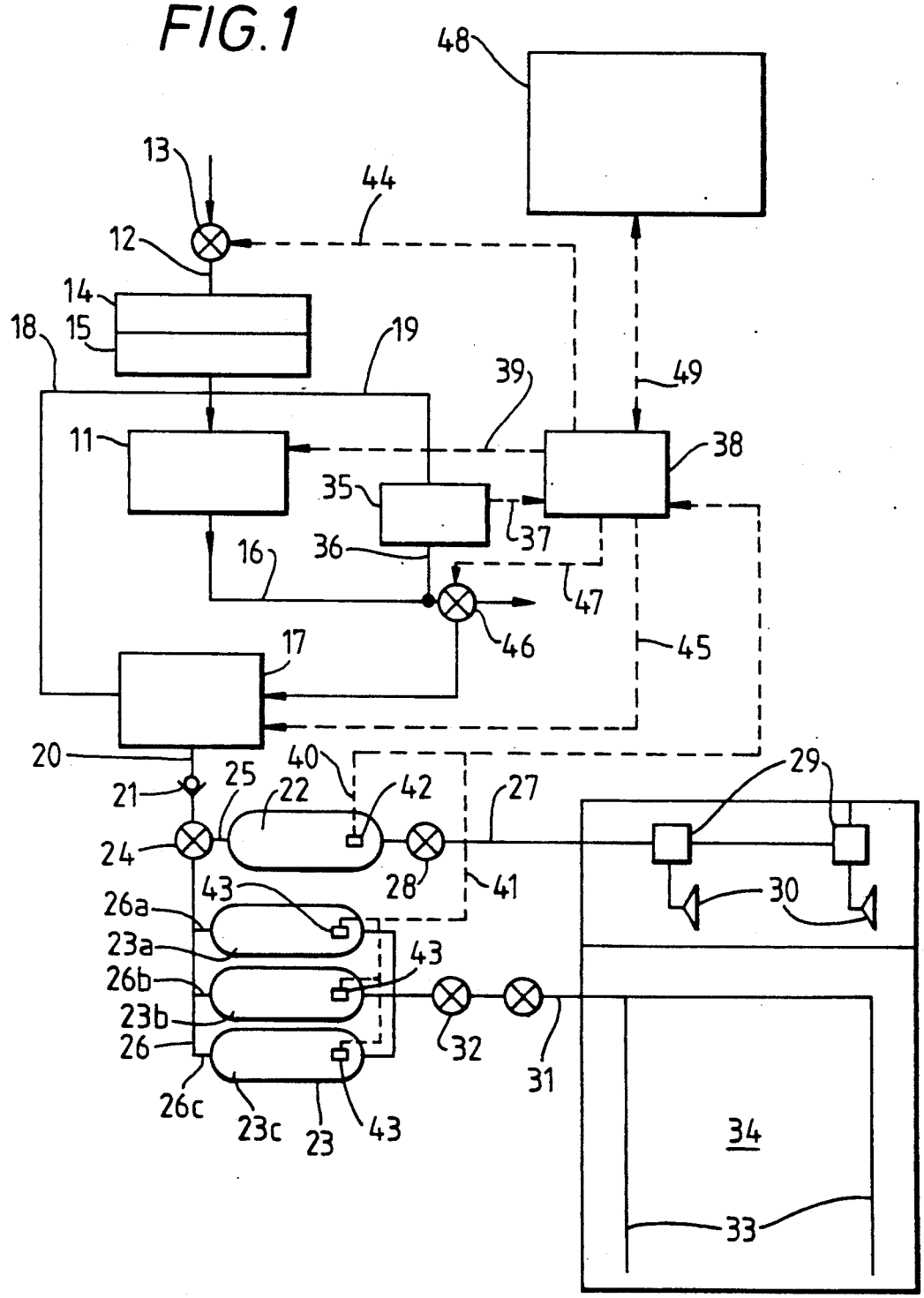
FIG. 1 is a diagrammatic illustration of an aircraft oxygen-rich gas breathing system in accordance with one embodiment of the invention.

The compressor 17 is operated to deliver oxygen-rich gas at increased pressure by way of a delivery line 20 which incorporates a non-return valve 21, to a flight crew oxygen-rich gas storage cylinder 22 and, also, to a bank of passenger oxygen-rich gas storage cylinders 23 which according to the aircraft size and requirements may number from three to fifteen cylinders, only three cylinders 23a, 23b, 23c being shown in FIG. 1. The delivery line 20 connects with a priority valve 24 which may be switched as will hereinafter be described to enable the crew storage cylinder 22 to be charged in priority over the passenger storage cylinders 23. The priority valve 24 connects with the crew storage cylinder by way of a delivery line 25 connecting with the storage cylinder 22 and with the passenger storage cylinders by a delivery line 26 having branch lines 26a, 26b, 26c connecting with the storage cylinders 23a, 23b, 23c, respectively.

Oxygen-rich gas from the crew storage cylinder 22 is delivered by a supply line 27 incorporating a pressure reducing valve 28, to two demand regulators 29 which feed product gas on demand to two face masks 30 provided one at each of the pilot and co-pilot stations. Oxygen-rich gas from the passenger storage cylinders 23 is delivered by way of a supply line 31 connected with the cylinders 23a, b, c, and incorporating a pressure reducing valve 32 to passenger supply ducts 33 which extend along each side of the passenger cabin 34 for the length thereof and to which drop-down breathing masks (not shown) are attached. Oxygen-rich gas is made available in the passenger cabin 34 for therapeutic use by cabin crew by a supply line (not shown) which may be tapped into the supply line 31 or the supply ducts 33. It will be appreciated, of course, that in an aircraft being used in a medical evacuation role oxygen-rich gas from the passenger storage cylinders would be made available for breathing by patients.

The content of oxygen in gas delivered by the concentrator apparatus is monitored by a monitor 35 which may be of any suitable form but which in this embodiment is a zirconia cell-type oxygen concentration sensor requiring a sample of oxygen-rich gas and a supply of reference air. The oxygen-rich gas sample is fed to the monitor 35 by a bleed line 36 connecting between the oxygen-rich gas delivery line 16 and the monitor, and the reference air is supplied by a bleed line 19 which is tapped into the supply air line 12. The monitor 35 is connected by a signal line 37 for delivering signals representative of oxygen concentration to an electronic control unit (ECU) 38. The ECU is connected by a signal line 39 for delivering electrical signals to the concentrator apparatus 11 whereby cycling of molecular sieve beds (not shown in FIG. 1) between on-stream/charge and off-stream/purge phases may be controlled to obtain delivery of gas of substantially maximum oxygen concentration.

The ECU 38 is connected by signal lines 40 and 41 to respective gas pressure sensors 42 and 43 provided on the crew and passenger gas storage cylinders 22 and 23, respectively. The ECU 38 is further connected by a signal line 44 to the shut-off valve 13 and by a signal line 45 to an electric motor (not shown in FIG. 1) of the compressor 17 whereby valves of the intensifier device are sequenced between open and shut positions.

A spill valve 46 is provided in the delivery line 16 between the concentrator apparatus 11 and compressor 17. The spill valve 46 is connected by a signal line 47 with the ECU 38 and is switched by the ECU to vent to atmosphere gas delivered by the concentrator apparatus when the oxygen content is sensed by the monitor 35 to be below 90%.

Also, in this embodiment the ECU 38 is connected to an aircraft data management facility such as the main aircraft on-board systems computer 48, by a signal line 49 which may be the main aircraft data bus. This connection provides for system status information to be made available to the aircrew as well as for built-in-tests to be carried out. Additionally, if desired, information may be fed from the on-board systems computer to the ECU for system management purposes.

In operation of the system, when the ECU 38 receives signals from the pressure sensors 42 or 43 indicating that the pressure of oxygen-rich gas stored in the crew gas storage cylinder 22 or the passenger gas storage cylinders 23 has fallen below a required value, the shut-off valve 13 is signalled to open to allow supply air to flow to the concentrator apparatus 11 and the compressor 17 and operation of the concentrator apparatus is initiated. As the concentrator apparatus comes on stream the content of oxygen in the gas delivered by the apparatus is sensed by the monitor 35 and signals are sent to the ECU which computes the signals and outputs signals over signal line 39 for control of cycling of the molecular sieve beds of the concentrator apparatus in obtainment of product gas of maximum oxygen concentration.

At the same time the spill valve 46 is switched to vent the delivery line 16 to atmosphere until the concentrator apparatus has come fully on-stream and the oxygen concentration in the gas delivered by the concentrator apparatus is sensed by the monitor 35 to be 90% or greater. The ECU 38 then signals the spill valve to close the vent to ambient so that oxygen-rich gas flows from the concentrator to the compressor 17 and the ECU initiates operation of the electric motor (not shown) for control of valves sequencing operation of the pressurising piston and cylinder assemblies, whereby the pressure of the oxygen-rich gas delivered by the concentrator apparatus is increased to a pressure required for charging the crew and passenger gas storage cylinders.

Whilst the oxygen concentrator apparatus may be of a size suitable for producing oxygen-rich gas to charge the storage cylinders from an empty condition, it is preferred in obtainment of smaller and lighter concentrator apparatus that initial charging of the storage cylinders be from a ground station and that the concentrator apparatus be of capacity sufficient for replenishing the cylinders when the content of stored gas falls below a desired value.

Oxygen concentrator apparatus in accordance with the invention will now be described with reference to FIGS. 2, 3 and 4, the apparatus being suited for use in a system such as that hereinbefore described with reference to and shown in FIG. 1.

Figure 2:
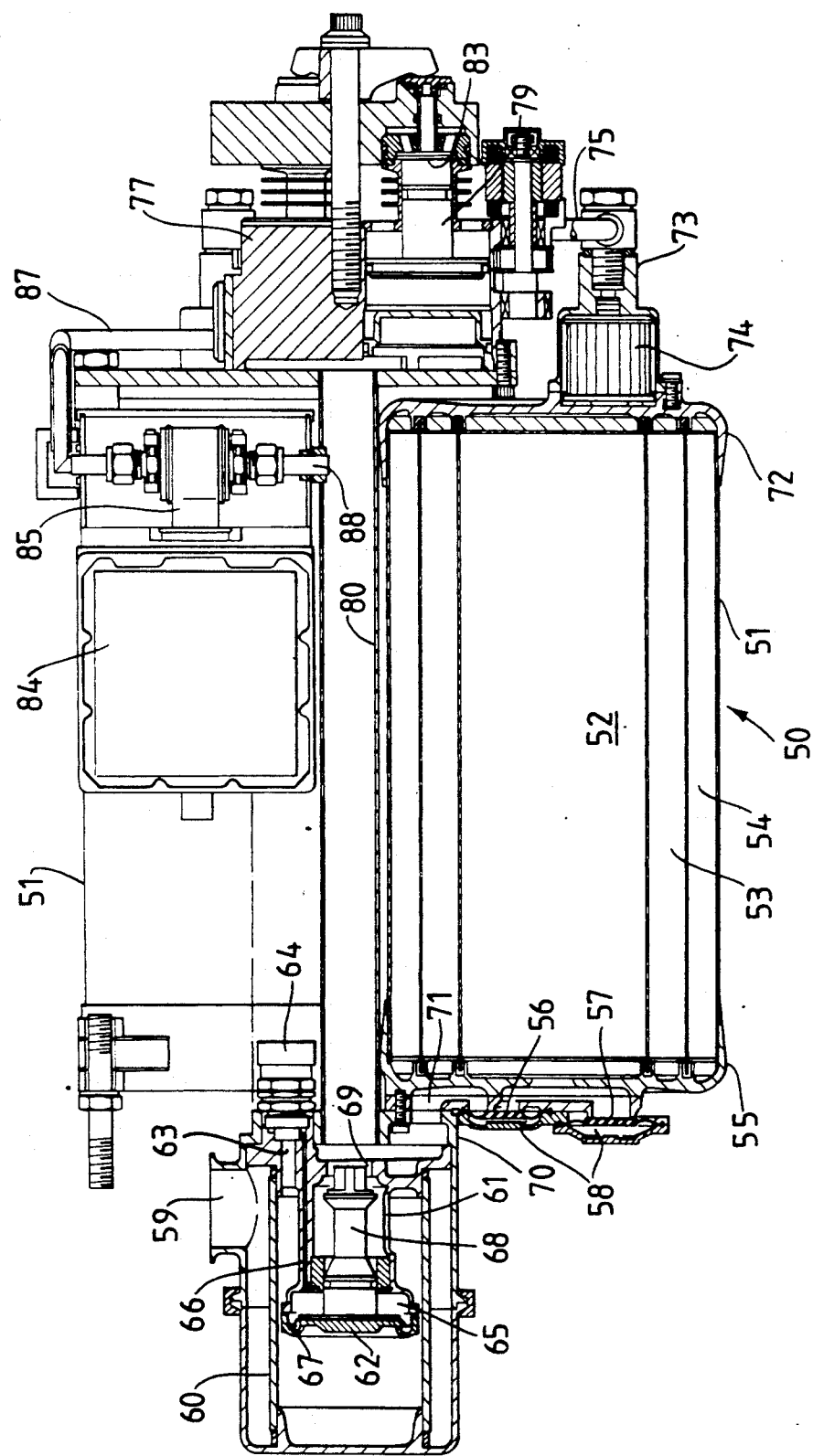
FIG. 2 is a side elevation of molecular sieve oxygen concentration apparatus in accordance with another embodiment of the invention suited for use in the system illustrated in FIG. 1.

The oxygen concentrator apparatus 50 comprises three multi-bed concentrators 51 (reference FIGS. 2 and 3), each concentrator providing three molecular sieve beds 52, 53, 54 arranged concentrically of each other as is seen from one of the concentrators in FIG. 2. Each concentrator has an inlet end comprised by a closure member 55 which incorporates an individual pair of diaphragm valves 56, 57 associated with each bed, only one pair of these valves being shown in FIG. 2. The diaphragm valve 56 controls entry of supply air into its associated bed during an on-stream/charge phase of the bed and the diaphragm valve 57 controls venting of the bed during an off-stream/purge phase. Operation of the diaphragm valves is controlled by servo-pressure in a servo-pressure chamber 58 at the back of each diaphragm valve, the chamber 58 being adapted to be vented to ambient by a solenoid valve (not shown).

Supply air is fed to the concentrators by way of supply air inlet means which include an inlet 59 adapted for connection to a source of supply air (not shown) which may be pressurised air bled from a compressor stage of one or more of aircraft engines. The inlet 59 is connected by way of a filter 60 with entry ports 61 (only one of which is visible in FIG. 2) of a pressure reducing valve 62. Supply air also flows by way of the inlet 59 and the filter 60 to an inlet port 63 of a datum pressure valve 64 which sets the pressure in a datum pressure chamber 65 by way of a bleed line 66. One wall of the datum pressure chamber 65 is provided by a diaphragm 67 which carries a valve member 68 regulating flow of supply air from an outlet 69 to the valve 62. The outlet 69 connects with a manifold 70 which distributes supply air to a supply air entry port 71 provided in the inlet end of each of the concentrators.

An outlet end of each concentrator 51 comprises a closure member 72 having an outlet 73 which optionally incorporates a gas filter 74. Oxygen-rich gas delivered by each of the beds 51, 52, 53 during an on-stream phase is fed to the outlet 73 through passages (not shown) in the closure member 72. The closure member 72 also houses a diaphragm valve (not shown) associated with each of the beds by which a portion of the oxygen-rich gas may enter a bed in an off-stream cycle to assist in purging retained nitrogen from that bed.

The outlet 73 of each concentrator is connected to a tubular manifold 75 having a delivery tube 76 connected with a compressor 77 which is mounted at the outlet ends of the concentrators. The compressor 77 is of the type disclosed in EP-A-0369623 (Normalair-Garrett) having a plurality of pressurising piston and cylinder assemblies 79, the pistons of which are pneumatically driven. Air for driving the pistons is provided by concentrator supply air which is delivered to the compressor 77 through a tubular supply duct 80 extending from the manifold 70 to connection with the compressor 77 and having the three concentrators 51 arranged around it as is best seen in FIGS. 3 and 4. The compressor further includes an electric motor 81 connected for driving a toothed belt 82 by which valves 83 (FIG. 2) are opened and closed in sequence to control operation of the pressurising piston and cylinder assemblies 79.

The electric motor 81 is connected for receiving signals for initiation of its operation from an electronic control unit (ECU) 84 which is also connected for signalling the solenoid valves (not shown) which control venting of the servo-pressure chambers 58 associated with the supply air inlet valves 56 and purge gas vent valves 57 at the inlet ends of the concentrators. The ECU 84 is connected for receiving oxygen concentration signals from a zirconia cell-type oxygen concentration sensor 85. The sensor 85 receives for its operation a sample of oxygen-rich product gas bled from the tubular manifold 75 by way of a tubular bleed line 87, and a supply of reference air bled from the tubular supply duct 80 by way of a bleed line 88. Operation of such zirconia cell-type concentration sensors is well known, see for example EP-A-0391607 (Normalair-Garrett), and will not be here described in detail.

As described for the system of FIG. 1 the ECU 84 receives signals indicating the status of the pressure in crew and passenger gas storage cylinders and computes the content of these cylinders. If the content has fallen below a desired value the ECU initiates operation of the concentrators 51 and the compressor 77 to produce oxygen-rich gas for charging the storage cylinders. The sensor 85 monitors the content of oxygen in the oxygen-rich gas delivered by the concentrators and signals transmitted to the ECU 84 are computed to generate output signals for control of the solenoids at the inlet ends of the concentrator beds whereby the beds are cycled through on-stream and off-stream phases in obtainment of substantially maximum oxygen concentration in the product gas.

Dependent upon the intended flight profile and usage of a system in accordance with the present invention, the size of the concentrator apparatus may be reduced by designing to suit one optimal set of supply conditions, for example, high bleed pressure/high altitudes. Providing that this set of conditions is reached on a sufficient number of occasions to make up for likely losses and system flow demands then the concentrator apparatus may be isolated at all other times. This will require either the provision of additional monitors at the concentrator inlet or a data interface with the aircraft systems computer 48 by the signal line 49 (FIG. 1).

Alternatively, a system in accordance with the present invention may be made adaptable to a wide range of supply conditions by allowing the pressure intensifier to operate over a range of delivery rates under authority of the ECU. Whilst this requires additional monitors to assess the quality of supply air and additional control logic in the ECU, it enables a high flow of oxygen-rich gas to be produced under good conditions with a reduction in flow at other times.

In a system having concentrator apparatus comprised by a number of independent concentrators, additional reliability may be obtained by monitoring the individual output of each concentrator and providing means for isolating a concentrator in the event of a malfunction. The system will continue to function at reduced performance level and a flag will be provided to indicate that maintenance action is required.

What is claimed is:

1. Apparatus for supplying oxygen-rich gas for breathing by crew and passengers of a passenger carrying aircraft, comprising first gas storage means adapted for pre-charging with oxygen-rich gas and connected by first supply line means for delivering said oxygen-rich gas to an aircraft flight crew cabin for continuous breathing by a flight crew member flying the aircraft above a predetermined altitude and for breathing by all flight crew in the event of cabin decompression; second gas storage means adapted for pre-charging with oxygen-rich gas and connected by second supply line means for delivering said oxygen-rich gas for breathing by occupants of an aircraft passenger cabin in the event of cabin decompression; means for monitoring the content of oxygen-rich gas in the first and second gas storage means; molecular sieve oxygen concentrator means having a supply air inlet end and an oxygen-rich gas outlet end; supply air delivery means adapted for connection between a source of supply air and the inlet end of the concentrator means; oxygen-rich gas delivery means adapted for connection between the outlet end of the concentrator means and the first and second gas storage means; means for sensing the content of oxygen-rich gas in the first and second gas storage means; means for initiating operation of the concentrator means when the content of oxygen-rich gas in one or both of the first and second gas storage means is sensed to have fallen below a required content value; means for monitoring the content of oxygen in oxygen-rich gas delivered by the concentrator means; spill valve means connected in the oxygen-rich gas delivery means; means connecting the spill valve means with the oxygen-rich gas sensing means whereby the spill valve means is signalled by the sensing means to open and vent to ambient oxygen-rich gas delivered by the concentrator means when the oxygen content of said gas is sensed as being below a required value; compressor means connected in the oxygen-rich gas delivery means; means connecting the compressor means with the oxygen-rich gas sensing means whereby the spill valve means is signalled to close and the compressor means is signalled to commence operating to increase the pressure of oxygen rich gas delivered by the concentrator means when the content of said gas is sensed to be above the required value for delivery to the first and second gas storage means.

2. A method of supplying oxygen-rich gas for breathing by crew and passengers of a passenger carrying aircraft comprising the steps of:

delivering oxygen-rich gas from first gas storage means pre-charged with oxygen-rich gas to an aircraft flight crew cabin for continuous breathing by a flight crew member flying the aircraft during flight above a predetermined altitude and for breathing by all flight crew members in the event of cabin decompression;

delivering oxygen-rich gas from second gas storage means pre-charged with oxygen-rich gas to an aircraft passenger cabin for breathing by occupants of the passenger cabin in the event of cabin decompression;

monitoring the content of oxygen-rich gas in the first and second gas storage means;

initiating operation of molecular sieve oxygen concentrator means located on-board of the aircraft to produce oxygen-rich gas when the content of oxygen-rich gas in one or both of the first and second gas storage means is sensed to have fallen below a required content value;

sensing the content of oxygen in oxygen-rich gas delivered by the concentrator means;

venting to ambient oxygen-rich gas delivered by the concentrator means when the oxygen content of said gas is sensed as being below a required value;

increasing the pressure of oxygen-rich gas delivered by the concentrator means when the oxygen content of said gas is sensed as being above the required value;

delivering the oxygen-rich gas at increasing pressure for charging the first and second storage means.

3. A method according to claim 2, including the step of priority charging the first gas storage means and thereafter charging the second gas storage means when the content of both the first and second gas storage means is sensed to have fallen below their required content value.

4. A method according to claim 2, including the step of pre-charging the first and second gas storage means with 100% gaseous oxygen from a ground station.

5. Apparatus for generating oxygen-rich gas for a system supplying oxygen-rich gas for breathing by crew and passengers of a passenger carrying aircraft, comprising a plurality of multi-bed molecular sieve oxygen concentrators each having a supply air inlet end and an oxygen-rich gas outlet end, supply air inlet means adapted for connection to a source of supply air and including pressure regulating means and manifold means connected for distributing supply air to the inlet ends of the concentrators, means for monitoring the content of oxygen in oxygen-rich gas delivered by the concentrators, control means responsive to signals from the oxygen content monitor for controlling cycling of the concentrator beds between on-stream/charge and off-stream/purge phase whereby gas enriched with oxygen to substantially maximum concentration is delivered at the outlet ends of the concentrators, manifold means connected to the outlet ends of the concentrators for receiving oxygen-rich gas delivered by the concentrators, compressor means including inlet means connected to the oxygen-rich gas manifold means for receiving said gas and operable to increase the pressure of said gas for delivery from compressor outlet means, the compressor means comprising a common compressor connected for receiving oxygen-rich gas from each of the concentrators, the compressor further comprising oxygen-rich gas pressurizing piston and cylinder assemblies adapted to be driven by supply air, wherein supply air for driving the piston and cylinder assemblies is delivered to the compressor from the supply air delivery means by way of a duct having the multi-bed concentrators arranged therearound.

6. Apparatus for generating oxygen-rich gas for a system supplying oxygen-rich gas for breathing by crew and passengers of a passenger carrying aircraft, comprising a plurality of multi-bed molecular sieve oxygen concentrators each having a supply air inlet end and an oxygen-rich gas outlet end, supply air inlet means adapted for connection to a source of supply air and including pressure regulating means and manifold means connected for distributing supply air to the inlet ends of the concentrators, means for monitoring the content of oxygen in oxygen-rich gas delivered by the concentrators, control means responsive to signals from the oxygen content monitor means for controlling cycling of the concentrator beds between on-stream/charge and off-steam/purge phase whereby gas enriched with oxygen to substantially maximum concentration is delivered at the outlet ends of the concentrators, manifold means connected to the outlet ends of the concentrators for receiving oxygen-rich gas delivered by the concentrators, compressor means including inlet means connected to the oxygen-rich gas manifold means for receiving said gas and operable to increase the pressure of said gas for delivery from compressor outlet means, and oxygen content monitor means associated with each concentrator so that the oxygen content of oxygen-rich gas delivered by each concentrator is separately monitored and means are provided for shutting down and isolating an individual concentrator in the event of malfunction.

* * * * *